US006095315A

United States Patent [19]

Andersch et al.

[11] Patent Number: 6,095,315

[45] Date of Patent: Aug. 1, 2000

[54] SORTING APPARATUS

[75] Inventors: Walter Andersch; Rudolf Schuster, both of Kirchheim, Germany

[73] Assignee: Siemens Aktiengesellschaft, Munich, Germany

[21] Appl. No.: 09/043,015

[22] PCT Filed: Sep. 5, 1996

[86] PCT No.: PCT/DE96/01651

§ 371 Date: Mar. 4, 1998

§ 102(e) Date: Mar. 4, 1998

[87] PCT Pub. No.: WO97/09131

PCT Pub. Date: Mar. 13, 1997

[30] Foreign Application Priority Data

Sep. 7, 1995 [DE] Germany .......................... 195 33 118

[51] Int. Cl.[7] .......................... B65G 47/10; B65G 47/46

[52] U.S. Cl. .......................... 198/370.05; 198/370.03; 198/845

[58] Field of Search .......................... 198/370.03, 370.05, 198/367.1, 704, 838, 845

[56] References Cited

U.S. PATENT DOCUMENTS

| | | | |
|---|---|---|---|
| 2,689,657 | 9/1954 | Lens | 198/370.05 |
| 3,679,045 | 7/1972 | Morgan et al. | 198/370.05 |
| 4,183,707 | 1/1980 | D'Aloia | 198/370.05 X |
| 4,375,256 | 3/1983 | Selleri | 198/370.05 X |
| 5,850,901 | 12/1998 | Schuster et al. | 198/370.03 X |

*Primary Examiner*—Christopher P. Ellis
*Assistant Examiner*—Gene O. Crawford
*Attorney, Agent, or Firm*—Hill & Simpson

[57] ABSTRACT

A sorting apparatus is provided which includes a plurality of article carriers which circulate on a conveying device. The article carriers are capable of discharging the articles in a controllable manner. Each article carrier includes a fixed wall and a movable wall. The movable wall forms, in a closed position, together with the fixed wall, a receiving pocket for the articles. The movable wall also forms, in a discharge position, together with the fixed wall, an injection slit which is open at the bottom of the pocket and which is intended to convey the articles downward through an injection chute formed by the movable wall. The movable wall engages a support structure such as a plurality of rollers or wheels for conveying the articles. The movable wall may also include a slit for receiving a distal end of the fixed wall to the two walls together in the closed position.

17 Claims, 2 Drawing Sheets

SORTING APPARATUS

FIELD OF THE INVENTION

The invention relates to a sorting apparatus which is suitable, in particular, for sorting and distributing mail in public post offices or central in-house mail departments of large companies.

BACKGROUND OF THE INVENTION

A known sorting apparatus comprises a plurality of conveyable-article carriers which circulate on at least one conveying device and are intended for receiving and transporting the conveyable articles and for discharging them in a controllable manner, each conveyable-article carrier comprising a fixedly arranged wall part and a movably arranged wall part, the movably arranged wall part forming, in a closed position, together with the fixedly arranged wall part, a receiving pocket for the conveyable articles, the movably arranged wall part forming, in a discharging position, together with the fixedly arranged wall part, an ejection slit which is open at the bottom and is intended for the conveyable articles, and one of the two wall parts forming an ejection chute which adjoins the ejection slit at the bottom and is inclined counter to the transporting direction. In the case of such a sorting apparatus, which is known, for example, from WO 95/02469, the ejection chute has the effect of reducing the relative speed between the discharged conveyable articles and a sorting container which receives the latter. Moreover, even when the conveyable articles are located obliquely, the ejection chute permits vertical discharge and ordered stacking of the conveyable articles in the corresponding sorting containers.

The earlier German Patent Application 19516666.3 describes a device for transferring articles, which is likewise suitable for mail in particular. This transfer device has a transfer element which receives, between an endlessly circulating conveying belt and an endlessly circulating pressure-exerting belt, articles arriving on a first conveying device and discharges these articles to circulating article carriers of a second conveying device. Reliable transfer of the articles is achieved in that it is possible to displace the discharging region of the transfer element in the transporting direction of the article carriers, and in that the transfer element and the second conveying device are aligned with respect to one another such that the articles are discharged into the associated article carrier without a movement component transverse with respect to the transporting direction.

During the transfer or the discharge of articles into conveyable-article carriers circulating on a conveying device, it may be the case that, depending on the speed and mass of the respective conveyable articles, there are more or less pronounced jolts against the wall parts of the conveyable-article carriers. In addition, the aim is to design a conveyable-article carrier with as lightweight a construction as possible, in order to keep the production outlay low and to reduce the mass of the circulating conveyable-article carriers. Thus, for example during sorting of mail, use is preferably made of conveyable-article carriers whose wall parts are produced by the injection-molded plastic.

SUMMARY OF THE INVENTION

The problem on which the present invention is based is to configure a sorting apparatus of the type mentioned in the introduction such that damage to the conveyable-article carriers, which are of lightweight construction, during introduction of the articles can be reliably avoided with low outlay.

The invention is based on the finding that the severest stressing to which the circulating conveyable-article carriers are subjected occurs only during introduction of the articles, and that it is thus sufficient for measures for mechanically stabilizing the article carriers to be provided only in the introduction region. This temporary mechanical stabilization of the conveyable-article carriers is effected by supporting means which are arranged in the introduction region, beneath the circulating conveyable-article carriers, and are intended for the wall part forming the ejection chute. It is thus possible to dispense with a more sturdy design of the conveyable-article carriers.

In an embodiment, the present invention provides an apparatus for sorting articles that comprises a plurality of article carriers mounted for movement in a transporting direction on a conveying device. Each article carrier comprises a movable wall and a fixed wall. When the movable wall is in a closed position, the movable wall and the fixed wall form a pocket for receiving the articles. When the movable wall is in a discharge position, the movable wall and the fixed wall also form an ejection slit for discharging the articles. One of either the fixed wall or the movable wall also forms an ejection chute disposed below the slit. The ejection chute is inclined in a direction opposite the transporting direction. Further, the wall that forms the ejection chute, either the fixed or movable wall, engages a supporting structure disposed below the article carriers that acts to reduce damage to the article carriers during use while still enabling the fixed and movable walls to be fabricated from lightweight and inexpensive materials.

In an embodiment, undesirable frictional forces between the stationary supporting means and the circulating conveyable-article carriers are avoided by the use of supporting wheels or supporting rollers.

In an embodiment, a plurality of supporting wheels are preferably used as supporting means, as a result of which, in particular, the supporting region can be extended, as seen in the transporting direction. The supporting action can be further improved in this embodiment, in that at least two supporting wheels are arranged transversely with respect to the transporting direction.

In an embodiment supporting wheels which are offset in the transporting direction permit particularly uniform support.

In an embodiment elastically compliant supporting means permit the ejection chutes of the circulating conveyable-article carriers to be supported in a manner which avoids jolts, and thus noise, to the greatest possible extent.

In an embodiment, such elastically compliant supporting means can be realized particularly easily by supporting wheels equipped with pneumatic tires.

In an embodiment, the ejection chute is preferably formed by the movable wall part, since the support of the movable wall part is considerably more effective than support of the fixedly arranged wall part.

In an embodiment, the sorting apparatus of the present invention permits further stabilization of the two wall parts without the adjustment of the movable wall part into the discharging position being obstructed. In an embodiment, this further stabilization is made possible in a particularly simple manner in that at least one nose of the fixedly arranged wall part engages in the associated slit of the movably arranged wall part.

Other objects and advantages of the present invention will become apparent from reading the following detailed description and appended claims, and upon reference to the accompanying drawings.

BRIEF DESCRIPTION OF THE DRAWINGS

An exemplary embodiment of the invention is described in more detail hereinbelow and illustrated in the drawing, in which.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Figure 1:
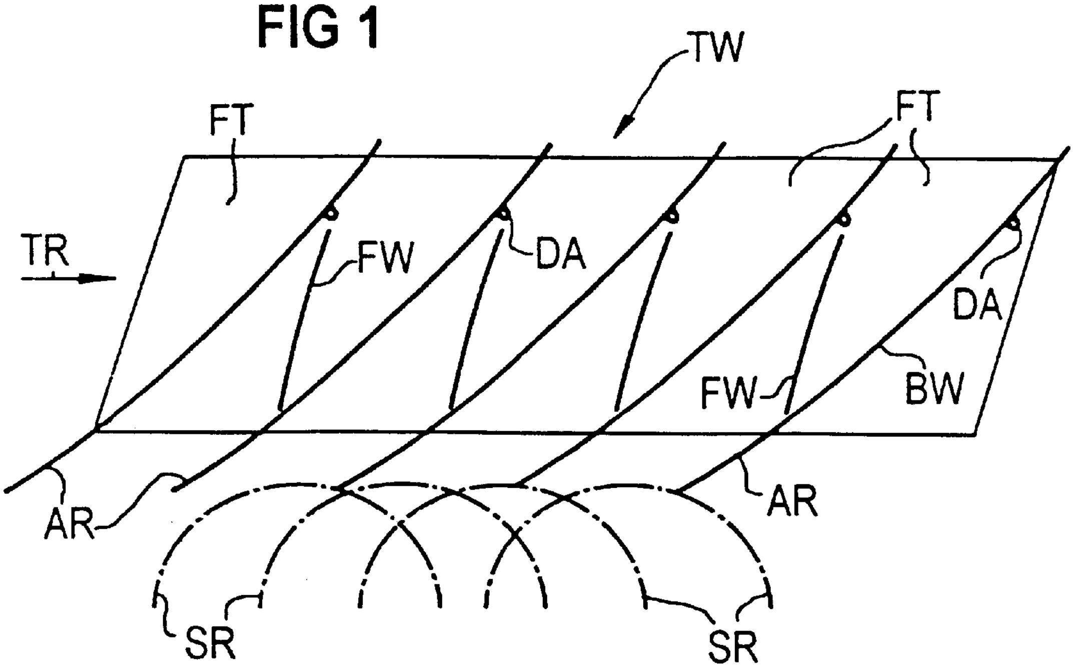
FIG. 1 illustrates, in a vastly simplified schematic illustration, a side view of the circulating conveyable-article carriers of a sorting apparatus for mail and of supporting wheels which are arranged in the introduction region and are assigned to the circulating conveyable article carriers.

DETAILED DESCRIPTION OF THE PRESENTLY PREFERRED EMBODIMENTS;

FIG. 1 illustrates a transporting carriage TW on which a total of five conveyable-article carriers FT are fitted. The transporting carriage TW, which, together with further transporting carriages, circulates in the transporting direction TR on a conveying device (not illustrated specifically in FIG. 1), is a constituent part of a sorting apparatus for mail, the construction and functioning of which is described in more detail, for example, in WO 95/02469.

Each of the total of five conveyable-article carriers FT fitted on the transporting carriage TW comprises a fixedly arranged wall part FW and a movably arranged wall part BW, these two wall parts together forming in the closed position, which is illustrated in FIG. 1, an approximately V-shaped receiving pocket for the mail. Each movably arranged wall part BW can be pivoted, around a swivel pin which runs perpendicularly with respect to the plane of the drawing and is designated by DA, into a discharging position such that, together with the fixedly arranged wall part FW, it forms an ejection slit which is open at the bottom and is intended for the mail. The movably arranged wall part BW is extended downwards in this case such that, in the discharging position, it forms an ejection chute AR which adjoins the ejection slit at the bottom and is inclined counter to the transporting direction TR. In this case, in the discharging position, the mail is transferred in a specific manner, via said ejection chute AR, to sorting containers (which are not illustrated specifically in the drawing).

At the sorting-apparatus introduction region, which is illustrated in FIG. 1 and in which the conveyable-article carriers FT are loaded with mail, there are provided, beneath the circulating transporting carriages TW, a plurality of supporting wheels SR which are arranged in a stationary manner, support the ejection chutes AR of the circulating conveyable-article carriers FT from beneath and preferably also push these ejection chutes upwards elastically to a slight extent. These supporting wheels SR are suitable for at least partially absorbing the jolt forces produced by the impact of the mail. It is thus possible to dispense with mechanical reinforcement or a more sturdy design of the conveyable-article carriers FT.

Figure 2:
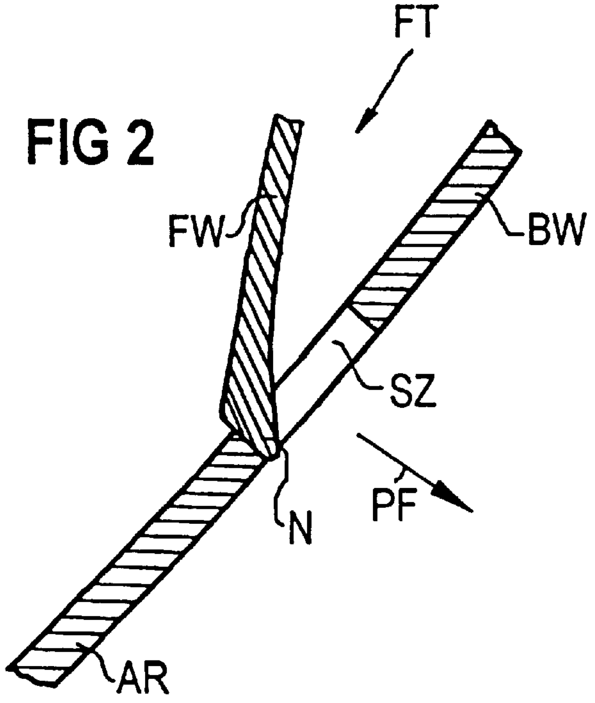
FIG. 2 illustrates a section through the bottom region of a conveyable-article carrier with a nose of the fixedly arranged wall part engaging in a slit of the movably arranged wall part.

FIG. 2 illustrates a section through the bottom part of a conveyable-article carrier FT. It can be seen that the bottom end of the fixedly arranged wall part FW is provided with a thickened nose N which, in the closed position illustrated, engages in an associated slit SZ of the movably arranged wall part BW. As seen perpendicularly with respect to the plane of the drawing, the fixedly arranged wall part FW has, for example, four spaced-apart noses N, which each engage an associated slit SZ of the movably arranged wall part BW.

It can also be seen from FIG. 2 that, during the introduction of the mail, jolt forces acting on the fixedly arranged wall part FW are transmitted at least partially, via the noses N, to the movably arranged wall part BW, which for its part, according to FIG. 1, is supported on the supporting wheels SR via the ejection chute AR. Moreover, the positively locking engagement of the noses N in the associated slits SZ results in certain stiffening and stabilization of the conveyable-article carrier FT as a whole.

FIG. 2 also illustrates that the noses N do not obstruct adjustment, indicated by the arrow PF, of the movably arranged wall part BW into its discharging position. This is made possible in that both the bottom supporting surfaces of the noses N and the bottom ends of the slits SZ are aligned tangentially with respect to an imaginary circle around the respective swivel pin DA (see FIG. 1).

Figure 3:
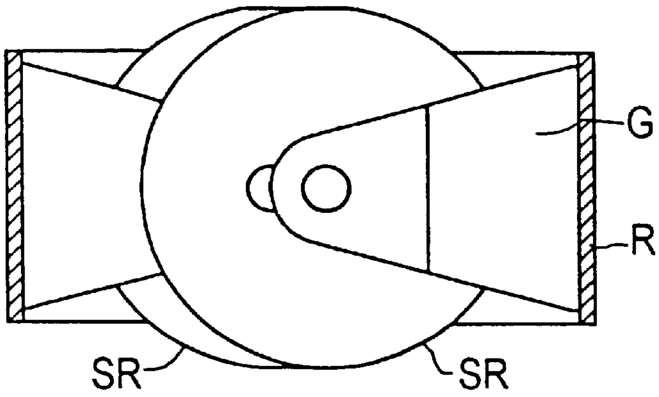
FIG. 3 illustrates a side view of the supporting wheels illustrated schematically in FIG. 1.
Figure 4:
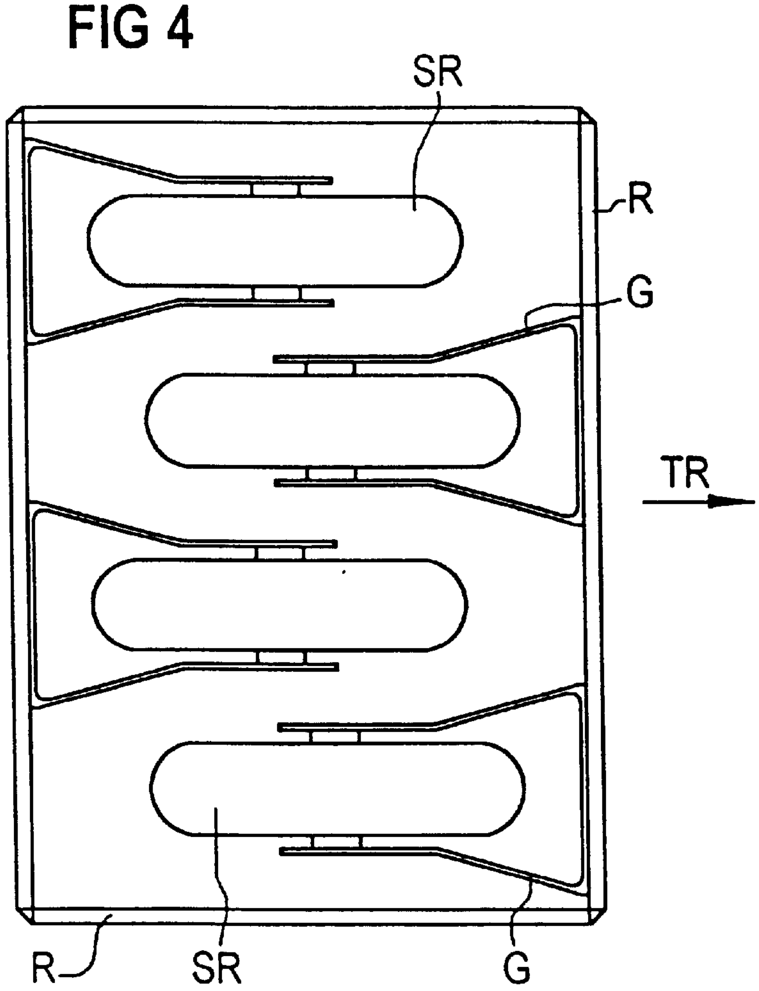
FIG. 4 illustrates a plan view of the supporting wheels illustrated in FIG. 3.

FIGS. 3 and 4 show, in side view and in plan view, respectively, a supporting means with a total of four supporting wheels SR. In this case, each supporting wheel SR is fastened in a closed frame R via a fork G. The individual supporting wheels SR, equipped with pneumatic tires, are aligned at regular intervals from one another, as seen perpendicularly with respect to the transporting direction TR, and are alternately set forward and set back, as seen in the transporting direction TR. This type of arrangement provides for extremely uniform support of the ejection chutes AR (see FIG. 1) in the introduction region.

Of the supporting means illustrated in FIGS. 3 and 4, two or more may be arranged one behind the other, as seen in the transporting direction TR, in the introduction region of the sorting apparatus. In the exemplary embodiment outlined, for example two of these supporting means with a total of eight supporting wheels may be arranged one behind the other in the introduction region.

In this respect, you are additionally referred to FIG. 1 with its merely schematically illustrated supporting wheels SR.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. An apparatus for sorting articles, the apparatus comprising:

a plurality of article carriers mounted for circulation in a transporting direction on a conveying device, the article carriers being disposed above a support structure, each article carrier comprising a movable wall and a fixed wall, the moveable wall being movable between a closed position and a discharge position, the movable wall forming, in the closed position, together with the fixed wall, a pocket for receiving the articles, the moveable wall forming, in the discharge position, together with the fixed wall, an ejection slit for discharging the articles, the movable wall also forming an ejection chute disposed below the ejection slit, the ejection chute being inclined in a direction opposite to the transporting direction, the movable wall engaging the supporting structure so that the ejection chute is in direct communication with the support structure.

2. The sorting apparatus of claim 1 wherein the supporting structure comprises at least one wheel.

3. The sorting apparatus of claim 1 wherein the supporting structure comprises at least one supporting roller.

4. The sorting apparatus of claim 1 wherein the supporting structure comprises a plurality of supporting wheels.

5. The sorting apparatus of claim 1 wherein the supporting structure comprises at least two supporting. wheels with rotational axes disposed transversely with respect to the transporting direction.

6. The sorting apparatus of claim 1 wherein the supporting structure comprises a plurality of supporting wheels that are offset from one another in the transporting direction.

7. The sorting apparatus of claim 1 wherein the ejection chute is formed by the fixed wall.

8. The sorting apparatus of claim 1 wherein the supporting structure is further characterized as being an elastically yielding supporting structure.

9. The sorting apparatus of claim 8 wherein the elastically yielding supporting structure comprises a plurality of supporting wheels each of which accommodating at least one pneumatic tire.

10. The sorting apparatus of claim 1 wherein, in the closed position, the fixed wall and the moveable wall releasably engage one another so that movement of the moveable wall from the closed position to the discharging position is not obstructed by the fixed wall.

11. The sorting apparatus of claim 10 wherein the fixed wall comprises a lower distal end, the lower distal end of the fixed wall comprises a nose, the moveable wall further comprises a slit, and in the closed position, the nose of the fixed wall releasably engages the slit of the movable wall.

12. An apparatus for sorting articles, the apparatus comprising:

a plurality of article carriers mounted for movement in a transporting direction on a conveying device, the article carriers being disposed above a support structure, the article carrier comprising a movable wall and a fixed wall, the moveable wall being movable between a closes position and a discharge position, the moveable wall forming, in the closed position, together with the fixed wall, a pocket for receiving the articles, the moveable wall forming, in the discharge position, together with the fixed wall, an ejection slit for discharging the articles, the movable wall further forming an ejection chute disposed below the ejection slit, the ejection chute being inclined in a direction opposite to the transporting direction, the movable wall engaging the supporting structure so that the ejection chute is in direct communication with the support structure, the fixed wall comprising a lower distal end, the lower distal end of the fixed wall comprising a nose, the movable wall further comprises a slit, and in the closed position, the nose of the fixed wall releasably engages the slit of the movable wall.

13. The sorting apparatus of claim 12 wherein the supporting structure comprises a plurality of supporting wheels.

14. The sorting apparatus of claim 12 wherein the supporting structure comprises at least two supporting wheels with rotational axes disposed transversely with respect to the transporting direction.

15. The sorting apparatus of claim 12 wherein the supporting structure comprises a plurality of supporting wheels that are offset from one another in the transporting direction.

16. The sorting apparatus of claim 12 wherein the supporting structure is comprises a plurality of supporting wheels each of which accommodating at least one pneumatic tire.

17. An apparatus for sorting articles, the apparatus comprising:

a plurality of article carriers mounted for movement in a transporting direction on a conveying device, the article carriers being disposed above a support structure, the article carrier comprising a movable wall and a fixed wall, the moveable wall being movable between a close position and a discharge position, the movable wall forming, in the closed position, together with the fixed wall, a pocket for receiving the articles, the moveable wall forming, in the discharge position, together with the fixed wall, an ejection slit for discharging the articles, the movable wall further forming an ejection chute disposed below the ejection slit, the ejection chute being inclined in a direction opposite to the transporting direction, the fixed wall comprises a lower distal end, the lower distal end of the fixed wall comprises a nose, the moveable wall further comprises a slit, and in the closed position, the nose of the fixed wall releasably engages the slit of the movable wall, the movable wall engaging the supporting structure, the supporting structure comprising a plurality of shock absorbing wheels.

* * * * *